United States Patent
Lee et al.

(10) Patent No.: US 9,191,142 B2
(45) Date of Patent: Nov. 17, 2015

(54) OPTICAL NETWORK UNIT HAVING POWER SAVING FUNCTION AND POWER SAVING METHOD THEREOF

(71) Applicant: Electronics and Telecommunications Research Institute, Daejeon-si (KR)

(72) Inventors: Han-Hyub Lee, Daejeon-si (KR); Sang-Soo Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 106 days.

(21) Appl. No.: 13/895,453

(22) Filed: May 16, 2013

(65) Prior Publication Data

US 2014/0186035 A1 Jul. 3, 2014

(30) Foreign Application Priority Data

Jan. 2, 2013 (KR) ........................ 10-2013-0000304

(51) Int. Cl.
*H04J 14/00* (2006.01)
*H04J 14/02* (2006.01)

(52) U.S. Cl.
CPC .................................. *H04J 14/0221* (2013.01)

(58) Field of Classification Search
CPC .... H04B 10/27; H04B 10/272; H04B 10/278; H04B 10/116; H04B 10/2507; H04B 10/2587; H04B 10/40; H04B 10/516; H04B 10/564; H04B 10/60; H04B 10/032; H04B 10/038; H04B 10/11; H04B 10/1149; H04B 10/2503; H04B 10/2543; H04B 10/25754; H04B 10/29; H04B 10/50; H04B 10/503; H04B 10/506; H04B 10/532; H04B 10/572; H04B 10/61; H04B 10/613; H04B 10/614; H04B 10/616; H04B 10/67; H04B 10/6971; H04B 10/85; H04B 2210/08; H04B 7/024; H04B 7/0452; H04J 14/0221
USPC ................. 398/19, 34, 45, 94, 22–24, 70–72, 398/135–139, 58
See application file for complete search history.

(56) References Cited

U.S. PATENT DOCUMENTS

| | | | |
|---|---|---|---|
| 8,542,998 B2* | 9/2013 | Kamijo et al. ................... | 398/72 |
| 2010/0111523 A1* | 5/2010 | Hirth et al. ...................... | 398/25 |
| 2012/0128357 A1* | 5/2012 | Mukai et al. .................... | 398/58 |
| 2012/0177361 A1* | 7/2012 | Hirano et al. .................... | 398/1 |

OTHER PUBLICATIONS

Han-Hyub Lee et al., "Demonstration of power saved 10 Gb/s WDM-PON ONU based on simple traffic monitoring method", The 19th Conference on Optoelectronics and Optical Communications, 2012.
Tatsuya Uchikata et al., "A novel power saving scheme for WDM-PON with centralized light sources", OptoElectronics and Communications Conference, 2009, OECC 2009. 14th, pp. 1-2.

* cited by examiner

*Primary Examiner* — Danny Leung
(74) *Attorney, Agent, or Firm* — Rubin & Berdo, P.C.

(57) ABSTRACT

An optical network unit (ONU) having a power saving function for reducing power consumption in an optical network and a power saving method thereof are provided. The ONU includes a first signal transmitter-receiver unit configured to transmit and receive a signal to and from an optical line terminal, a second signal transmitter-receiver unit configured to transmit and receive a signal to and from customer premises equipment through multiple communication ports, a signal processing unit configured to control a signal to be transmitted and received through the first signal transmitter-receiver unit and the second signal transmitter-receiver unit, and a processor configured to control powers of the first signal transmitter-receiver unit and the signal processing unit according to whether data traffic is received through the plurality of communication ports.

10 Claims, 9 Drawing Sheets

US 9,191,142 B2

OPTICAL NETWORK UNIT HAVING POWER SAVING FUNCTION AND POWER SAVING METHOD THEREOF

CROSS REFERENCE TO RELATED APPLICATION

This application claims the benefit under 35 U.S.C. §119 (a) of a Korean Patent Application No. 10-2013-0000304, filed on Jan. 2, 2013, in the Korean Intellectual Property Office, the entire disclosure of which is incorporated herein by reference for all purposes.

BACKGROUND

1. Field

The following description relates to technology capable of reducing power consumption of an optical network unit (ONU) to be used in an optical network.

2. Description of the Related Art

As technology for effectively providing a band necessary for a user end, optical network technology has a point-to-point or point-to-multipoint structure. An optical line terminal (OLT) has an interface for supporting a plurality of ONUs, and has the right to control all ONUs. In general, the point-to-point structure is mainly used in an active optical network (AON) and the point-to-multipoint structure is mainly used in a passive optical network (PON). The AON and PON are being standardized by international standardization organizations such as Institute of Electrical and Electronics Engineers (IEEE) and International Telecommunication Union Telecommunication Standardization Sector (ITU-T).

As communication network systems are widely used in homes or offices at a high speed, the interest of efficient power consumption is also increasing. This phenomenon is not an exception even in an optical access network. Power supplies of an OLT and ONU constituting the optical access network are turned on for 24 hours of one day and 365 days of one year. Accordingly, when an actual use time of a user is assumed to be about 20%, an amount of dissipated power is significantly large. The need for research on various power saving techniques for reducing the above-described power consumption is increasing.

SUMMARY

The following description relates to an ONU having a power saving function for reducing power consumption in an optical network and a power saving method thereof.

In one general aspect, there is provided an ONU having a power saving function, comprising: a first signal transmitter-receiver unit configured to transmit and receive a signal to and from an OLT; a second signal transmitter-receiver unit configured to transmit and receive a signal to and from customer premises equipment (CPE) through multiple communication ports; a signal processing unit configured to control a signal to be transmitted and received through the first signal transmitter-receiver unit and the second signal transmitter-receiver unit; a processor configured to control powers of the first signal transmitter-receiver unit and the signal processing unit according to whether data traffic is received through the plurality of communication ports.

The plurality of communication ports of the second signal transmitter-receiver unit may detect data traffic received from the CPE according to each communication port and output a traffic alarm signal to the processor when the data traffic is detected.

The processor may receive and analyze the traffic alarm signal to be output according to each communication port, and operate a sleep mode of the ONU in a full sleep mode or a partial sleep mode according to an analysis result.

When no traffic alarm signal is output from all the communication ports of the second signal transmitter-receiver unit, the processor may interrupt powers of the first signal transmitter-receiver unit and the signal processing unit by operating the ONU in the full sleep mode.

When the traffic alarm signal is output from at least one communication port of the second signal transmitter-receiver unit during the operating of the full sleep mode, the processor may release the full sleep mode, and supply power to the first signal transmitter-receiver unit and the signal processing unit.

When no traffic alarm signal is output from some communication ports of the second signal transmitter-receiver unit, the processor may interrupt power of a corresponding input/output (I/O) port of the signal processing unit by operating the ONU in the partial sleep mode.

The signal processing unit may receive data traffic received by each communication port of the second signal transmitter-receiver unit from the CPE, and output a link-down alarm signal (LDAS) for a corresponding communication port to the processor when no data traffic is delivered from each communication port of the second signal transmitter-receiver unit for a preset time, and the processor may analyze a communication port-specific LDAS received from the signal processing unit and operate the ONU in the full sleep mode or the partial sleep mode according to an analysis result.

The signal processing unit may measure an amount of data traffic input from each communication port of the second signal transmitter-receiver unit, and determine whether the data traffic has been delivered by performing a comparison with the measured data traffic amount according to a time.

The first signal transmitter-receiver unit may comprise: a switch (S/W) unit configured to receive an upstream signal to be transmitted from the signal processing unit to the OLT and deliver the received upstream signal to a physical layer module (PHY); the PHY configured to receive the upstream signal from the S/W unit; and an optical transceiver configured to receive the upstream signal from the PHY and transmit the received upstream signal to the OLT.

When LDASs for all the communication ports are received from the signal processing unit, the processor may interrupt powers of the S/W unit, the PHY, and the optical transceiver of the first signal transmitter-receiver unit by operating the ONU in the full sleep mode.

When LDASs for some communication ports are received from the signal processing unit, the processor may interrupt powers of corresponding I/O ports of the S/W unit of the first signal transmitter-receiver unit.

The processor may cyclically operate a sleep cycle comprising a sleep mode time and a wakeup mode time during the operating of the full sleep mode. At this time, the processor may perform switching to the sleep mode time after performing a connectivity check between the ONU and the OLT by simultaneously activating the ONU and the OLT in the wakeup mode time of the sleep cycle.

In another general aspect, there is provided a power saving method of an ONU comprising: recognizing whether data traffic is received according to each communication port which receives the data traffic from a CPE; and controlling power of a component of the ONU according to a recognition result.

The recognizing may comprise: recognizing whether the data traffic is received according to each communication port using a traffic alarm signal generated in the communication port receiving the data traffic from the CPE.

The controlling may comprise: operating the ONU in a full sleep mode or a partial sleep mode according to a result of recognizing whether the data traffic is received according to each communication port.

The operating may comprise: operating the ONU in the full sleep mode when no traffic alarm signal is output from all communication ports; and operating the ONU in the partial sleep mode when no traffic alarm signal is output from some communication ports.

The operating may comprise: releasing the full sleep mode to perform switching to a wakeup mode when a traffic alarm signal is output from at least one communication port in the operating of the full sleep mode.

In still another general aspect, there is provided a power saving method of an ONU comprising: operating an OLT in a sleep mode after transmitting a sleep mode message to the OLT when the ONU does not receive data traffic from a CPE; and operating the sleep mode again after a connectivity check between the ONU and the OLT by simultaneously switching the ONU and the OLT to a wakeup mode cyclically within the sleep mode when the OLT is operated in the sleep mode according to the sleep mode message.

A sleep cycle comprising a sleep mode time and a wakeup mode time may cyclically iterated in the sleep mode, the ONU and the OLT may be simultaneously activated in the wakeup mode time of the sleep cycle, and switching to the sleep mode time may be performed after the connectivity check between the ONU and the OLT.

The power saving method may further comprise: performing, by the ONU, switching to the wakeup mode upon receiving data traffic from the CPE during the operating of the sleep mode, simultaneously transmitting a wakeup mode switching message to the OLT, and waiting for a response; and transmitting, by the ONU, data traffic to the OLT after receiving a response message from the OLT when switching to a standby mode is performed after the OLT receiving the wakeup mode switching message has transmitted the response message to the ONU.

Other features will become apparent to those skilled in the art from the following detailed description, which, taken in conjunction with the attached drawings, discloses exemplary embodiments of the invention.

Figure 1:
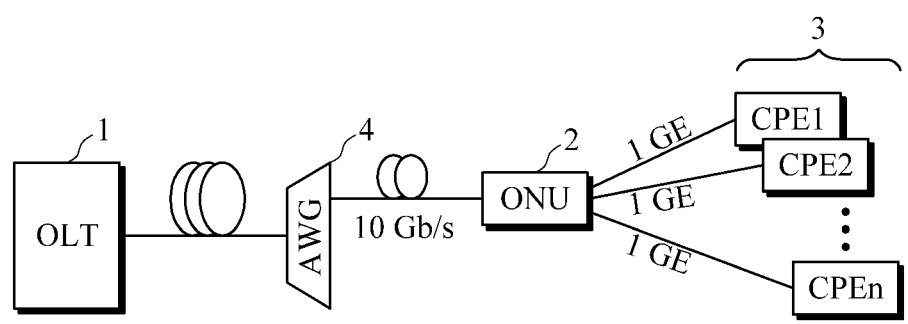
FIG. 1 is a configuration diagram of an exemplary wavelength division multiplexing (WDM)-PON.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a configuration diagram of an exemplary WDM-PON.

Referring to FIG. 1, the WDM-PON includes an OLT 1, an ONU 2, CPE 3, and an array waveguide grating (AWG) 4.

The OLT 1 is an optical termination device of a service provider side. The ONU 2 is a termination device installed at a user side for a connection to an optical network. A plurality of ONUs 2 may be provided. The CPE 3 is a device to be directly used by the user. For example, the CPE 3 may be a computer. As illustrated in FIG. 1, a plurality of pieces of CPE 3 may be provided. The AWG 4 receives an optical signal from the OLT 1, divides the received signal according to a unique wavelength allocated to each customer, and delivers the divided signal to the ONU 2. Although an example of the AWG 4 is illustrated in FIG. 1, the AWG 4 may be replaced with a power splitter based optical distribution network (ODN) or a hybrid WDM/power splitter ODN.

FIG. 1 illustrates an example of a 10-gigabit per second (Gb/s) WDM-PON. The 10-Gb/s WDM-PON has I/O ports such as gigabit Ethernet (GE) local area network (LAN) ports for enabling the ONU 2 to communicate with the CPE 3. A data traffic state between the ONU 2 and the CPE 3 is affected by usage behaviors of users. That is, used data traffic increases or decreases based on a time and date according to the usage behaviors of the users.

In an exemplary embodiment of the present invention, the ONU 2 adaptively operates in the sleep mode based on an uplink use amount between the ONU 2 and the CPE 3 so as to reduce power consumption of the ONU 2. Hereinafter, exemplary sleep mode operation technology of the ONU 2 will be described in detail with reference to the drawings.

Figure 2:
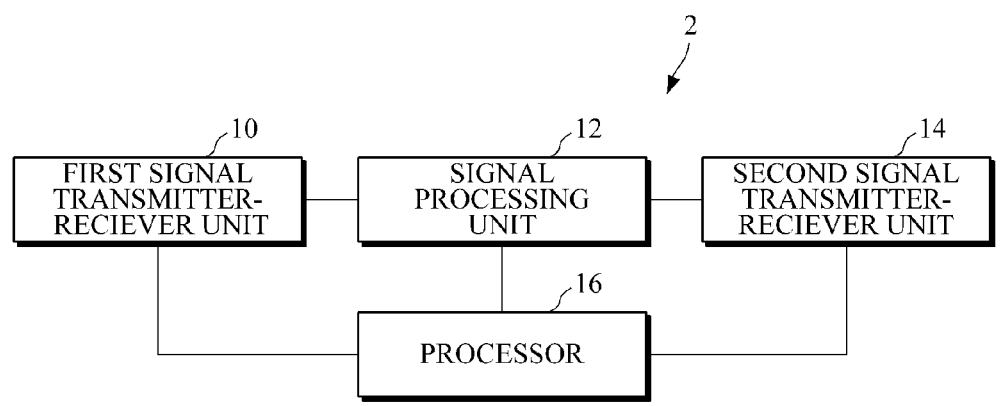
FIG. 2 is a configuration diagram of an exemplary ONU having a power saving function.

FIG. 2 is a configuration diagram of the exemplary ONU 2 having a power saving function.

Referring to FIG. 2, the ONU 2 includes a first signal transmitter-receiver unit 10, a signal processing unit 12, a second signal transmitter-receiver unit 14, and a processor 16.

The first signal transmitter-receiver unit 10 transmits and receives a signal to and from the OLT 1. According to a configuration of the OLT 1, the first signal transmitter-receiver unit 10 may transmit and receive a GE signal, a 10 GE signal, or the like to and from the OLT 1. Alternatively, a wireless signal can be transmitted and received.

The second signal transmitter-receiver unit 14 transmits and receives a signal to and from the CPE 3. The second signal transmitter-receiver unit 14 has multiple communication ports so as to transmit and receive a signal to and from the CPE 3. The second signal transmitter-receiver unit 14 may transmit and receive a GE signal to and from the CPE 3, and transmit and receive a wireless signal. When the GE signal is transmitted and received, a communication port of the second signal transmitter-receiver unit 14 serves as an Ethernet communication port.

The signal processing unit 12 controls a signal to be transmitted and received through the first signal transmitter-receiver unit 10 and the second signal transmitter-receiver unit 14. The signal processing unit 12 delivers an upstream signal received by the second signal transmitter-receiver unit 14 from the CPE 3 to the first signal transmitter-receiver unit 10. The signal processing unit 12 may be implemented with a GE PHY in the ONU 2.

The processor 16 is connected to the first signal transmitter-receiver unit 10, the signal processing unit 12, and the second signal transmitter-receiver unit 14, and controls the supply of powers of the first transmitter-receiver unit 10 and the signal processing unit 12 if necessary. For this, the processor 16 may selectively transmit a power control signal to the first signal transmitter-receiver unit 10 and the signal processing unit 12. The processor 16 is connected to multiple communication ports of the second signal transmitter-receiver unit 14, and may selectively control the supply of powers of the first signal transmitter-receiver unit 10 and the signal processing unit 12 according to whether data traffic reception is detected through the plurality of communication ports. Power consumption of the processor 16 is significantly smaller than the total power consumption of the ONU 2 so that the power consumption of the processor 16 may be ignored. A power control process of the processor 16 will be described in detail with reference to FIG. 3.

Figure 3:
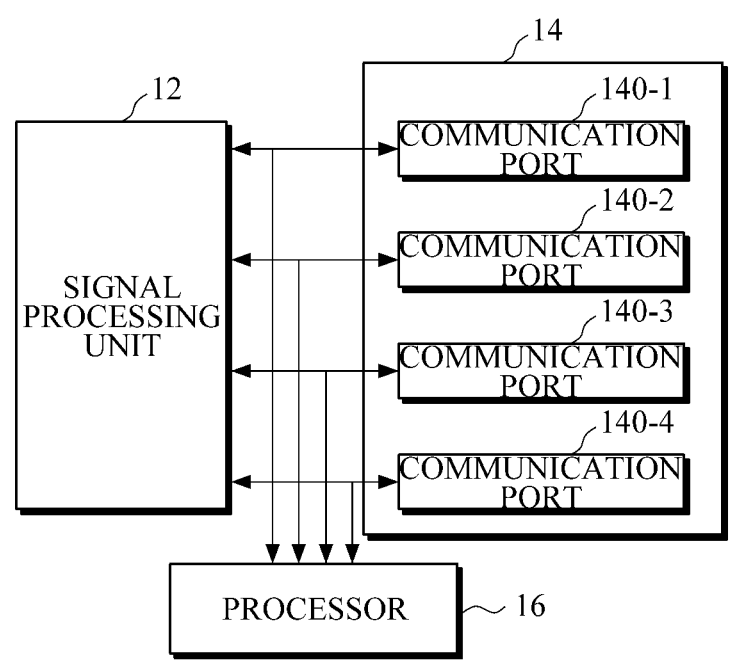
FIG. 3 is a detailed configuration diagram illustrating exemplary connection relationships between a signal processing unit, and a second signal transmitter-receiver unit and a processor of FIG. 2.

FIG. 3 is a detailed configuration diagram illustrating exemplary connection relationships between the signal processing unit 12, and the second signal transmitter-receiver unit 14 and the processor 16 of FIG. 2.

Referring to FIGS. 2 and 3, the second signal transmitter-receiver unit 14 has multiple communication ports 140-1, 140-2, 140-3, and 140-4. Although the 4 communication ports are illustrated in FIG. 3, the number of communication ports is not limited to 4. When the second signal transmitter-receiver unit 14 transmits and receives a GE signal to and from the CPE 3, the communication port of the second signal transmitter-receiver unit 14 serves as an Ethernet communication port.

The communication ports 140-1, 140-2, 140-3, and 140-4 detect whether data traffic is input from the CPE 3, generate a communication port-specific traffic alarm signal when the data traffic is detected, and output the generated traffic alarm signal to the processor 16. The presence/absence of data traffic may be cyclically detected at a preset time interval.

According to an exemplary embodiment of the present invention, it is determined whether there is a data traffic flow using traffic alarm signals to be output according to the communication ports 140-1, 140-2, 140-3, and 140-4 used in the second signal transmitter-receiver unit 14. Accordingly, it is possible to determine whether there is a data traffic flow from the CPE 3 without using a separate device for determining whether there is a data traffic flow. In addition to a method of determining whether there is a data traffic flow through the communication ports 140-1, 140-2, 140-3, and 140-4, it is possible to determine whether there is a data traffic flow from the CPE 3 by measuring an amount of traffic input to the signal processing unit 12 and performing a comparison with the measured traffic amount according to a time.

When the second signal transmitter-receiver unit 14 includes the plurality of communication ports 140-1, 140-2, 140-3, and 140-4, the processor 16 analyzes a traffic alarm signal output according to each of the communication ports 140-1, 140-2, 140-3, and 140-4, and controls operations of the first signal transmitter-receiver unit 10 and the signal processing unit 12 according to the analysis result. In detail, the processor 16 may operate the mode of the ONU 2 in a wakeup mode and a sleep mode according to the analysis result of the traffic alarm signal. Because the sleep mode includes a full sleep mode and a partial sleep mode, it is possible to selectively interrupt powers of the first signal transmitter-receiver unit 10 and the signal processing unit 12.

According to an exemplary embodiment, when no data traffic is detected from all the communication ports 140-1, 140-2, 140-3, and 140-4, that is, when no traffic alarm signal is detected from all the communication ports 140-1, 140-2, 140-3, and 140-4, the processor 16 switches the ONU 2 to the full sleep mode. In this case, powers of the first signal transmitter-receiver unit 10 and the signal processing unit 12 are interrupted. When the power of the first signal transmitter-receiver unit 10 is interrupted, the processor 16 may directly maintain power of a downstream signal reception means from the OLT 1 of the first transmitter-receiver unit 10 while interrupting power of an upstream signal transmission means to the OLT 1 of the first signal transmitter-receiver unit 10.

When data traffic is detected in at least one of the communication ports 140-1, 140-2, 140-3, and 140-4 after the power is interrupted, the processor 16 starts communication by directly supplying power to the first transmitter-receiver unit 10 and the signal processing unit 12.

On the other hand, when no data traffic is detected from some communication ports among the plurality of communication ports 140-1, 140-2, 140-3, and 140-4, that is, when no traffic alarm signal is received from some communication ports among the plurality of communication ports 140-1, 140-2, 140-3, and 140-4, the processor 16 switches the ONU 2 to the partial sleep mode and interrupts only powers of corresponding I/O ports of the signal processing unit 12.

Figure 4:
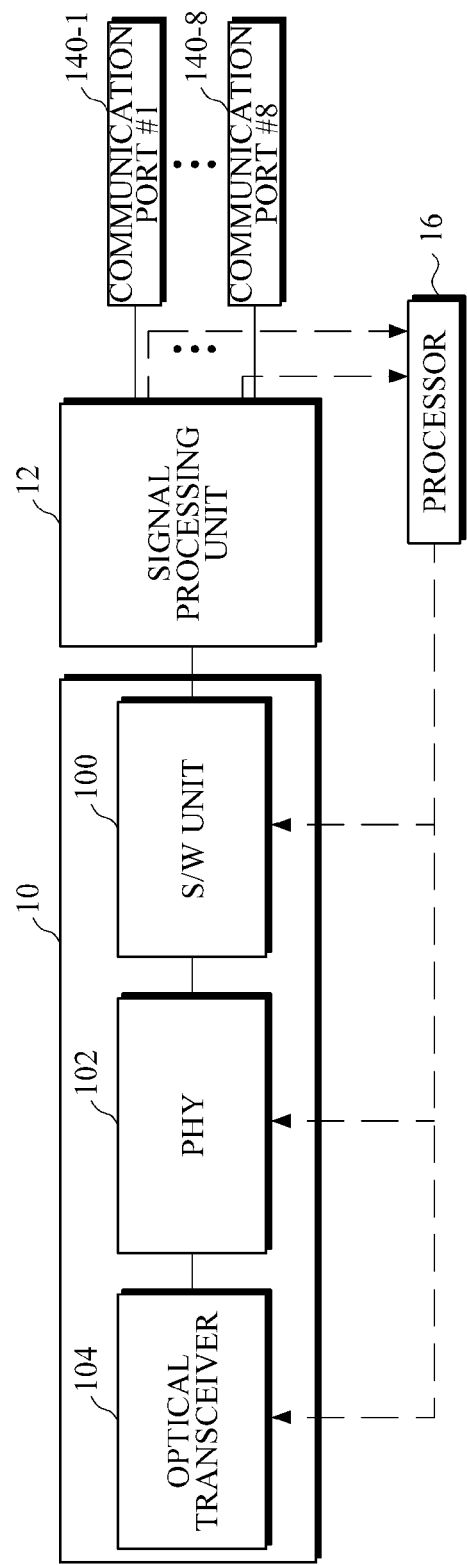
FIG. 4 is a configuration diagram illustrating another exemplary ONU having the power saving function.

FIG. 4 is a configuration diagram illustrating another exemplary ONU 2 having the power saving function.

Referring to FIG. 4, the ONU 2 includes a first signal transmitter-receiver unit 10, a signal processing unit 12, a second signal transmitter-receiver unit 14, and a processor 16. The first signal transmitter-receiver unit 10 includes an S/W unit 100, a PHY 102, and an optical transceiver 104.

Although the S/W unit 100, the PHY 102, and the optical transceiver 104, for example, may be implemented with a 10-Gb/s PON S/W a 10-Gb/s PHY, and a 10-Gb/s 10 gigabit small form factor pluggable (XFP) optical transceiver (OTRx), the present invention is not limited thereto.

The S/W unit 100 receives an upstream signal to be transmitted from the signal processing unit 12 to the OLT, and delivers the received upstream signal to the PHY 102. The PHY 102 receives the upstream signal from the S/W unit 100. The optical transceiver 104 receives the upstream signal from the PHY 102, and transmits the received upstream signal to the OLT. The S/W unit 100 is a component of which power consumption is largest among components of the ONU 2. According to an exemplary embodiment, power saving of the S/W unit 100 is maximized.

The second signal transmitter-receiver unit 14 has multiple communication ports 140-1, 140-2, . . . , 140-8. Although the 8 communication ports are illustrated in FIG. 4, the number of communication ports is not limited to 8. The signal processing unit 12 receives data traffic from the CPE through each of the communication ports 140-1, 140-2, . . . , 140-8 of the second signal transmitter-receiver unit 14.

Figure 5:
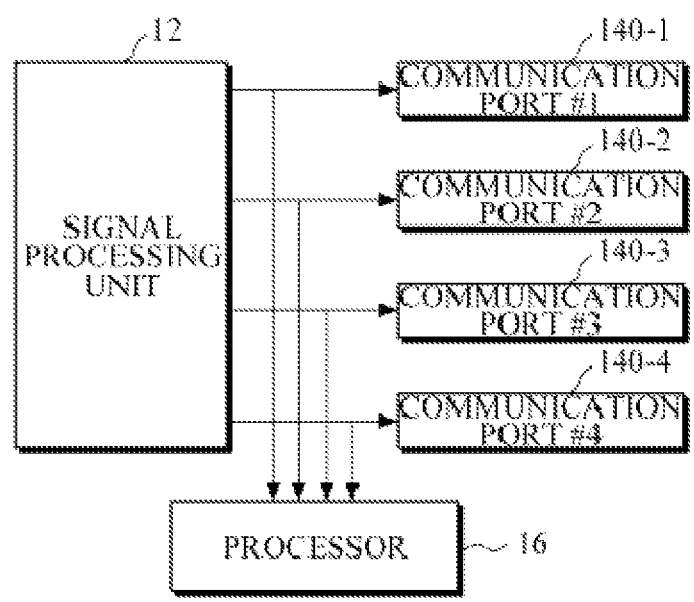
FIG. 5 is a detailed configuration diagram illustrating exemplary connection relationships between a signal processing unit, and a second signal transmitter-receiver unit and a processor of FIG. 4.

FIG. 5 is a detailed configuration diagram illustrating an exemplary connection relationships between the signal processing unit 12, and the second signal transmitter-receiver unit 14 and the processor 16 of FIG. 4.

Although the 4 communication ports are illustrated in FIG. 5, the number of communication ports is not limited to 4. Referring to FIGS. 4 and 5, the signal processing unit 12 receives data traffic from a CPE according to communication ports 140-1, 140-2, 140-3, and 140-4 of the second signal transmitter-receiver unit 14. According to an exemplary embodiment, when no data traffic is received from a CPE according to each of the communication ports 140-1, 140-2, 140-3, and 140-4 of the second signal transmitter-receiver unit 14 for a preset time (for example, 1 ms), an LDAS for a corresponding communication port is output to the processor 16. The signal processing unit 12 may determine whether there is data traffic delivery by measuring an amount of data traffic input from each of the communication ports 140-1, 140-2, 140-3, and 140-4 of the second signal transmitter-receiver unit 14 and performing a comparison with the measured data traffic amount according to a time.

According to an exemplary embodiment, the processor 16 analyzes an LDAS specific to each of the communication ports 140-1, 140-2, 140-3, and 140-4 received from the signal processing unit 12, and operates the ONU 2 in the full sleep mode or the partial sleep mode according to the analysis result. The processor 16 may selectively interrupt powers of the S/W unit 100, the PHY 102, and the optical transceiver 104 of the first signal transmitter-receiver unit 10 according to a type of sleep mode. For this, the processor 16 may transmit a power control signal to the S/W unit 100, the PHY 102, and the optical transceiver 104.

According to an exemplary embodiment, upon receiving LDASs for all the communication ports 140-1, 140-2, 140-3, and 140-4 from the signal processing unit 12, the processor 16 operates the ONU 2 in the full sleep mode, and simultaneously interrupts all powers of the S/W unit 100, the PHY 102, and the optical transceiver 104 of the first signal transmitter-receiver unit 10.

On the other hand, upon receiving LDASs for some communication ports among the communication ports 140-1, 140-2, 140-3, and 140-4 from the signal processing unit 12, the processor 16 interrupts only powers of corresponding I/O ports of the S/W unit 100 by operating the ONU 2 in the partial sleep mode.

Figure 6:
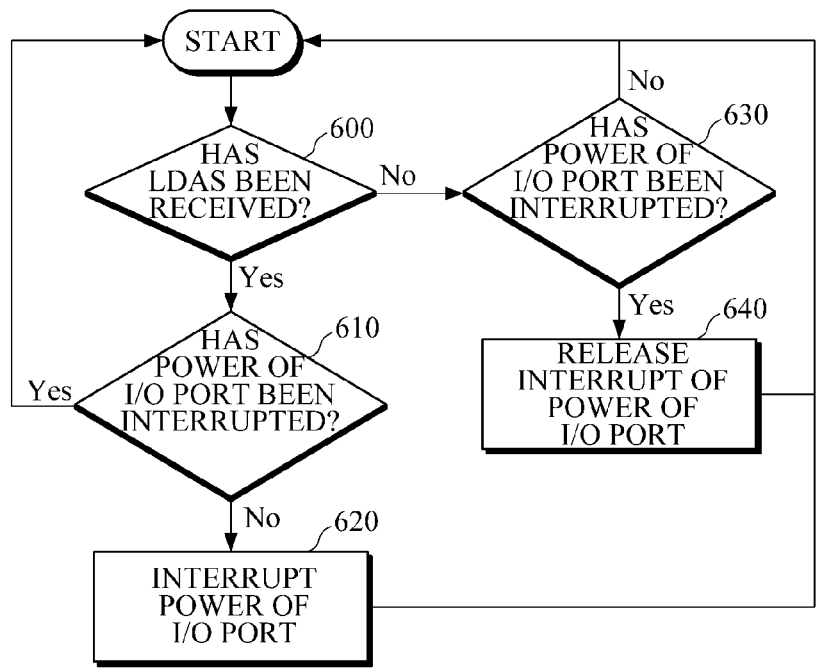
FIG. 6 is a flowchart illustrating an exemplary process of operating a partial sleep mode in the ONU of FIG. 5.

FIG. 6 is a flowchart illustrating an exemplary process of operating the partial sleep mode in the ONU of FIG. 5.

Referring to FIGS. 5 and 6, the processor 16 checks whether an LDAS for a predetermined communication port of the first signal transmitter-receiver unit 10 has been received from the signal processing unit 12 (600), and checks whether power of a corresponding I/O port of the S/W unit 100 has been interrupted when the LDAS for the predetermined communication port has been received (610). When the check result indicates that the power has not been interrupted, the power of the corresponding I/O port of the S/W unit 100 is interrupted (620).

On the other hand, when no LDAS for the predetermined communication port of the first signal transmitter-receiver unit 10 has been received, the processor 16 checks whether power of a corresponding I/O port of the S/W unit 100 has been interrupted (630). When the check result indicates that the power has been interrupted, the interrupt of the power of the corresponding I/O port of the S/W unit 100 is released (640).

Figure 7:
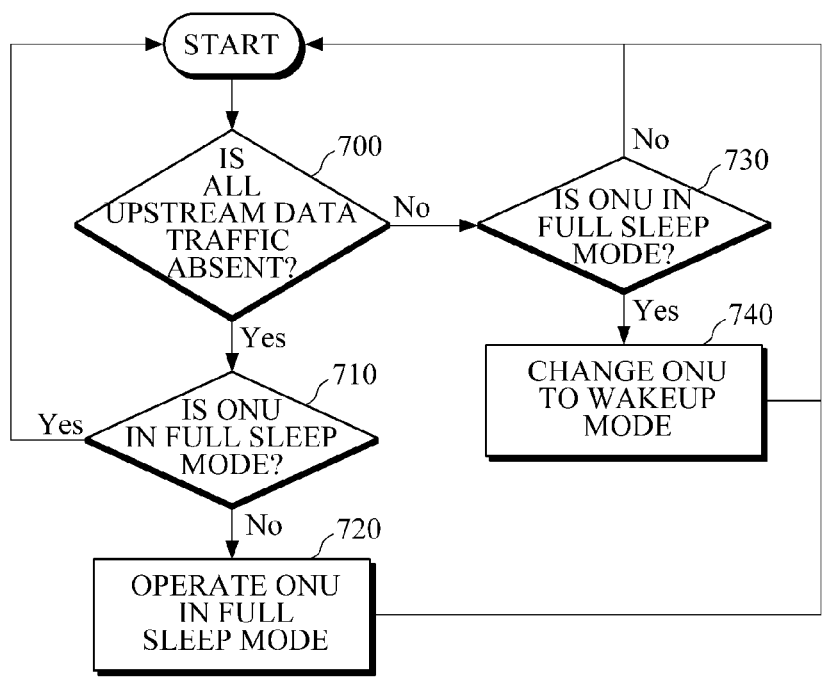
FIG. 7 is a flowchart illustrating an exemplary process of operating a full sleep mode in the ONU of FIG. 5.

FIG. 7 is a flowchart illustrating an exemplary process of operating the full sleep mode in the ONU of FIG. 5.

Referring to FIGS. 5 and 7, the processor 16 checks whether data traffic has been input from a CPE to all communication ports of the first signal transmitter-receiver unit 10 (700). That is, it is checked whether LDASs for all communication ports of the first signal transmitter-receiver unit 10 from the signal processing unit 12 have been received and it is checked whether the ONU is in the full sleep mode when the LDASs for all the communication ports have been received (710). When the ONU is not in the full sleep mode, the ONU operates in the full sleep mode (720). On the other hand, when the LDASs for all the communication ports have not been received, it is checked whether the ONU is in the full sleep mode (730). When the ONU is in the full sleep mode, the ONU is changed to the wakeup mode (740).

Figure 8:
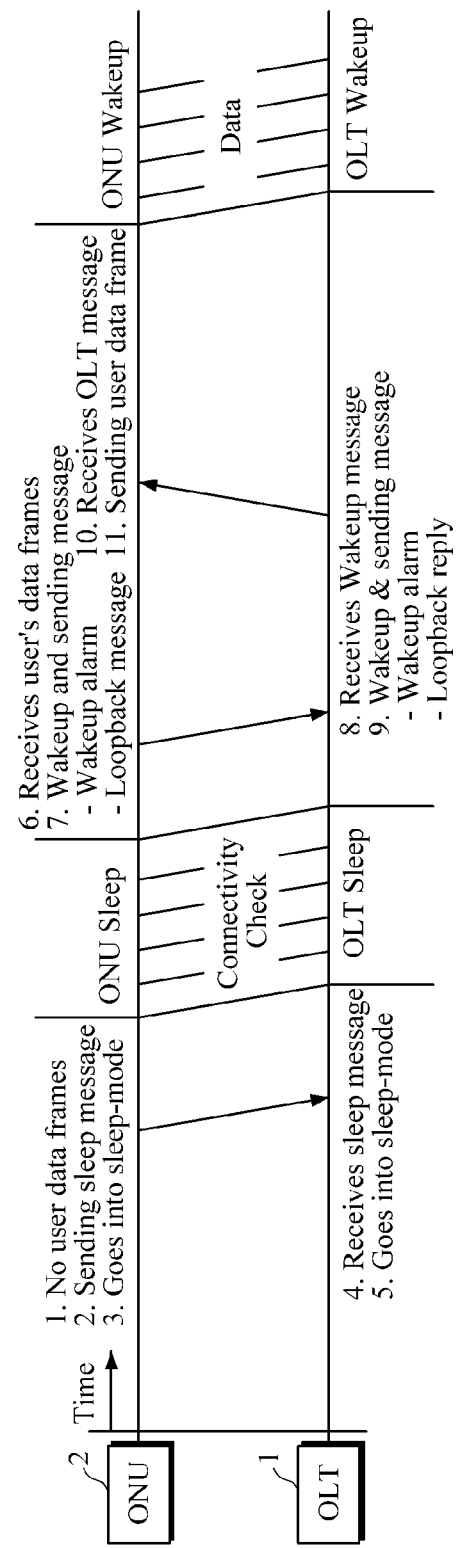
FIG. 8 is a flowchart illustrating an exemplary message transmission and reception process including a cyclic communication procedure between an ONU and an OLT when the sleep mode is in operation.

FIG. 8 is a flowchart illustrating an exemplary message transmission and reception process including a cyclic communication procedure between an ONU and an OLT when the sleep mode is in operation.

Referring to FIG. 8, a procedure in which the ONU 2 notifies the OLT 1 of an operation state even when the ONU 2 operates in the full sleep mode is necessary. This is because the OLT 1 monitors the overall network state by checking the operation state of the ONU 2. Accordingly, the present invention additionally proposes a cyclic communication procedure between the ONU 2 and the OLT 1 when the sleep mode is in operation. That is, the ONU 2 cyclically operates the sleep mode time and the wakeup mode time within the sleep mode. In the wakeup mode time, the ONU 2 transmits and receives a state signal to and from the OLT 1 so as to check the operation state with the OLT 1.

Hereinafter, a message transmission and reception process between the OLT 1 and the ONU 2 will be described in detail with reference to FIG. 8. In a signal transmission and reception process, the ONU 2 and the OLT 1 use a specified communication standard.

(1) If the ONU 2 does not receive data traffic from a CPE, (2) the ONU 2 transmits a sleep mode message to the OLT 1, and (3) the ONU 2 operates in the full sleep mode. In the full sleep mode, the ONU 2 interrupts powers of the upstream signal transmission means of the first signal transmitter-receiver unit 10 and the signal processing unit 12 described above with reference to FIGS. 2 and 3. At this time, the downstream signal reception means from the OLT 1 of the first signal transmitter-receiver unit 10 may be directly maintained without power interrupt.

(4) After the OLT 1 has received the sleep mode message from the ONU 2, (5) the OLT 1 operates in the sleep mode. During the sleep mode, the ONU 2 and the OLT 1 are cyclically switched to the wakeup mode and operate in the sleep mode again after a connectivity check between the ONU 2 and the OLT 1. For this, the sleep mode includes a cyclic wakeup mode time and sleep mode time. This will be described later in detail with reference to FIG. 9.

(6) If the ONU 2 receives data traffic from the CPE during the sleep mode, (7) the ONU 2 is immediately switched to the wakeup mode, simultaneously transmits a wakeup mode switching message to the OLT 1, and waits for a response.

(8) Upon receiving the wakeup mode switching message from the ONU 2, (9) the OLT (1) is switched to a standby state after transmitting a response message to the ONU 2.

(10) After receiving the response message from the OLT 1, (11) the ONU 2 starts the transmission of user data to the OLT 1.

Figure 9:
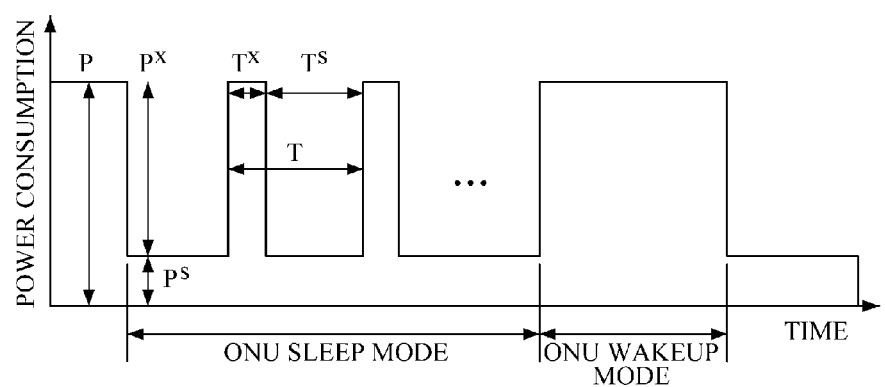
FIG. 9 is a reference diagram illustrating an exemplary time interval between a cyclic sleep mode and wakeup mode.

FIG. 9 is a reference diagram illustrating an exemplary time interval between a cyclic sleep mode and wakeup mode.

Referring to FIGS. 8 and 9, the ONU 2 has a sleep mode and a wakeup mode. Within a sleep mode, a sleep cycle T including a sleep mode time $T^s$ and a wakeup mode time $T^x$ is cyclically iterated. In the wakeup mode time $T^x$ of the sleep cycle T, the OLT 1 and the ONU 2 are simultaneously activated and switching to the sleep mode time $T^s$ is performed after a connectivity check between the OLT 1 and the ONU 2. In FIG. 9, P denotes power consumption, $P^s$ denotes power consumption during the full sleep mode, and $P^x$ denotes a power consumption difference between the sleep mode and the wakeup mode.

The present invention may be applied to a communication system connected in a point-to-point structure as well as an optical network. For example, the present invention may also be applied to a dense wavelength division multiplexing (DWDM) communication system and may be applied to reduce power consumption of an Internet sharing machine or the like used at home.

According to the exemplary embodiment described above, power of an ONU may be efficiently saved through upstream traffic monitoring in a PON. In particular, the power of the ONU can be efficiently saved by sensing whether there is an input of an upstream data signal through multiple communication ports of the ONU that receives an upstream signal from a CPE and operating a sleep mode of the ONU in a full sleep mode or a partial sleep mode according to the sensing result.

Further, because it is detected whether there is an upstream data signal through the plurality of communication ports of the ONU that receives an upstream signal from a CPE, a separate device of sensing whether there is a data traffic flow is unnecessary.

Further, power of the most power-consuming part such as a 10-Gb/s S/W of the ONU may be efficiently saved using a processor of the ONU and a traffic monitoring module.

Further, because a connectivity check between the ONU and the OLT is possible even during the sleep mode, it is possible to check an operation state between the ONU and the OLT.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical network unit (ONU) having a power saving function, comprising:
   a first signal transmitter-receiver unit configured to transmit and receive a signal to and from an optical line terminal (OLT);
   a second signal transmitter-receiver unit configured to transmit and receive a signal to and from customer premises equipment (CPE) through a plurality of communication ports;
   a signal processing unit configured to control a signal to be transmitted and received through the first signal transmitter-receiver unit and the second signal transmitter-receiver unit; and
   a processor configured to control powers of the first signal transmitter-receiver unit and the signal processing unit according to whether data traffic is received through the plurality of communication ports;
   wherein the processor performs an analysis of each of communication port-specific alarm signals indicating an absence of traffic for a preset time and respectively corresponding to the plurality of communication ports, and operates a sleep mode of the ONU in a full sleep mode if the analysis indicates that all of the plurality of communication ports have output the communication port-specific alarm signal, or a operates a partial sleep mode of the ONU if the analysis indicates that fewer than all of the plurality of communication ports have output the communication port-specific alarm signal.

2. The ONU of claim 1, wherein, when after operating in the full sleep mode the analysis indicates that fewer than all of the plurality of communication ports have output the communication port-specific alarm signal, the processor releases the full sleep mode, and supplies power to the first signal transmitter-receiver unit and the signal processing unit.

3. The ONU of claim 1,
   wherein the communication port-specific alarm signal is a link-down alarm signal (LDAS).

4. The ONU of claim 3, wherein the signal processing unit measures an amount of data traffic input from each communication port of the second signal transmitter-receiver unit, and determines whether the data traffic has been delivered by performing a comparison with the measured data traffic amount according to a time.

5. The ONU of claim 3,
   wherein the first signal transmitter-receiver unit comprises:
   a switch (S/W) unit configured to receive an upstream signal to be transmitted from the signal processing unit to the OLT and deliver the received upstream signal to a physical layer module (PHY);
   the PHY configured to receive the upstream signal from the S/W unit; and
   an optical transceiver configured to receive the upstream signal from the PHY and transmit the received upstream signal to the OLT, and
   wherein, when LDASs for all the communication ports are received from the signal processing unit, the processor interrupts powers of the S/W unit, the PHY, and the optical transceiver of the first signal transmitter-receiver unit by operating the ONU in the full sleep mode.

6. The ONU of claim 3,
   wherein the first signal transmitter-receiver unit comprises:
   an S/W unit configured to receive an upstream signal to be transmitted from the signal processing unit to the OLT and deliver the received upstream signal to a PHY;
   the PHY configured to receive the upstream signal from the S/W unit; and
   an optical transceiver configured to receive the upstream signal from the PHY and transmit the received upstream signal to the OLT, and
   wherein, when LDASs for some communication ports are received from the signal processing unit, the processor interrupts powers of corresponding I/O ports of the S/W unit of the first signal transmitter-receiver unit by operating the ONU in a partial sleep mode.

7. The ONU of claim 1, wherein the processor cyclically operates a sleep cycle including a sleep mode time and a wakeup mode time during the operating of the full sleep mode.

8. The ONU of claim 7, wherein the processor performs switching to the sleep mode time after performing a connectivity check between the ONU and the OLT by simultaneously activating the ONU and the OLT in the wakeup mode time of the sleep cycle.

9. A power saving method of an ONU comprising:
recognizing whether data traffic is received according to each communication port which receives the data traffic from a CPE; and
controlling power of a component of the ONU according to a recognition result,
wherein
   the recognition result is based at least partly on a communication port-specific alarm signal that is output based on the data traffic,
   the recognizing comprises recognizing whether the data traffic is received according to each communication port using a traffic alarm signal generated in the communication port receiving the data traffic from the CPE,
   the controlling comprises operating the ONU in a full sleep mode or a partial sleep mode according to a result of recognizing whether the data traffic is received according to each communication port, and
   the operating comprises operating the ONU in the full sleep mode when an alarm signal indicating no traffic is output from all communication ports, and operating the ONU in the partial sleep mode when the alarm signal indicating no traffic is output from fewer than all communication ports.

10. The power saving method of claim 9, wherein the operating further comprises:
releasing the full sleep mode to perform switching to a wakeup mode when the alarm signal indicating no traffic is output from fewer than all communication ports.

* * * * *

UNITED STATES PATENT AND TRADEMARK OFFICE
CERTIFICATE OF CORRECTION

| | | |
|---|---|---|
| PATENT NO. | : 9,191,142 B2 | Page 1 of 1 |
| APPLICATION NO. | : 13/895453 | |
| DATED | : November 17, 2015 | |
| INVENTOR(S) | : Han-Hyub Lee and Sang-Soo Lee | |

It is certified that error appears in the above-identified patent and that said Letters Patent is hereby corrected as shown below:

Title Page, Item 74 (Attorney, Agent, or Firm)

"Attorney, Agent, or Firm - Rubin & Berdo, P.C." should be changed to -- Attorney, Agent, or Firm - Rabin & Berdo, P.C. --

Signed and Sealed this
Twenty-second Day of March, 2016

Michelle K. Lee
*Director of the United States Patent and Trademark Office*